US011624304B2

(12) United States Patent
Zhang

(10) Patent No.: US 11,624,304 B2
(45) Date of Patent: Apr. 11, 2023

(54) METHOD FOR PREHEATING A CATALYTIC CONVERTER

(71) Applicant: Vitesco Technologies GmbH, Regensburg (DE)

(72) Inventor: Hong Zhang, Spitzwegstraße (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 17/717,927

(22) Filed: Apr. 11, 2022

(65) Prior Publication Data

US 2022/0235684 A1    Jul. 28, 2022

Related U.S. Application Data

(63) Continuation of application No. PCT/EP2020/074948, filed on Sep. 7, 2020.

(30) Foreign Application Priority Data

Oct. 11, 2019    (DE) ..................... 10 2019 215 698.3

(51) Int. Cl.
*F01N 3/20* (2006.01)
*F01N 3/30* (2006.01)

(52) U.S. Cl.
CPC ............. *F01N 3/2013* (2013.01); *F01N 3/30* (2013.01)

(58) Field of Classification Search
CPC ........ F01N 3/2013; F01N 3/2026; F01N 3/30; F01N 9/00; F01N 11/00; F01N 2430/08;
(Continued)

(56) References Cited

U.S. PATENT DOCUMENTS 5,163,290 A    11/1992    Kinnear
5,839,273 A    11/1998    Maus
(Continued)

FOREIGN PATENT DOCUMENTS

DE    4308180 A1    9/1994
DE    4340742 A1    6/1995
(Continued)

OTHER PUBLICATIONS

International Search Report and Written Opinion dated Sep. 7, 2020 from corresponding International Patent Application No. PCT/EP2020/074948.

(Continued)

*Primary Examiner* — Audrey B. Walter
*Assistant Examiner* — Dapinder Singh

(57) ABSTRACT

A method for preheating a catalytic converter which is arranged in the exhaust-gas flow of a motor vehicle and which has an electrically heated catalyst is described. The catalytic converter is preheated with the electrically heated catalyst to a maximum temperature within a period of time before the initial engine starting operation. In the process, the temperature of the electrically heated catalyst and the battery state of the vehicle are monitored. During the preheating, it is checked whether or not the battery state has fallen below a state threshold. If so, the heating of the electrically heated catalyst is stopped, and engine-internal measures are implemented. If not, further heating of the electrically heated catalyst is implemented until the maximum temperature is reached again.

7 Claims, 1 Drawing Sheet

(58) Field of Classification Search
CPC ......... F01N 2900/0422; F01N 2900/08; F01N 2900/104; F01N 2900/1602; F01N 2900/1404; F02D 41/0245; F02D 41/0255; F02D 41/1446; F02D 41/0235; Y02T 10/12; Y02T 10/40
See application file for complete search history.

(56) References Cited

U.S. PATENT DOCUMENTS

| | | | |
|---|---|---|---|
| 9,458,812 B2 * | 10/2016 | Santoso | B60K 6/48 |
| 10,989,087 B2 * | 4/2021 | Yokoi | B60K 6/28 |
| 11,162,468 B2 * | 11/2021 | Nakayama | F02D 41/024 |
| 11,306,640 B2 * | 4/2022 | Hirooka | F01N 3/2013 |
| 2008/0217315 A1 | 9/2008 | Bruck | |
| 2011/0047981 A1 | 3/2011 | Roos | |

FOREIGN PATENT DOCUMENTS

| | | |
|---|---|---|
| DE | 102010035480 A1 | 3/2011 |
| DE | 102017210749 A1 | 12/2018 |
| EP | 1967712 A2 | 9/2008 |

OTHER PUBLICATIONS

German Office Action dated Jul. 31, 2020 for corresponding German Patent Application No. 10 2019 215 698.3.

\* cited by examiner

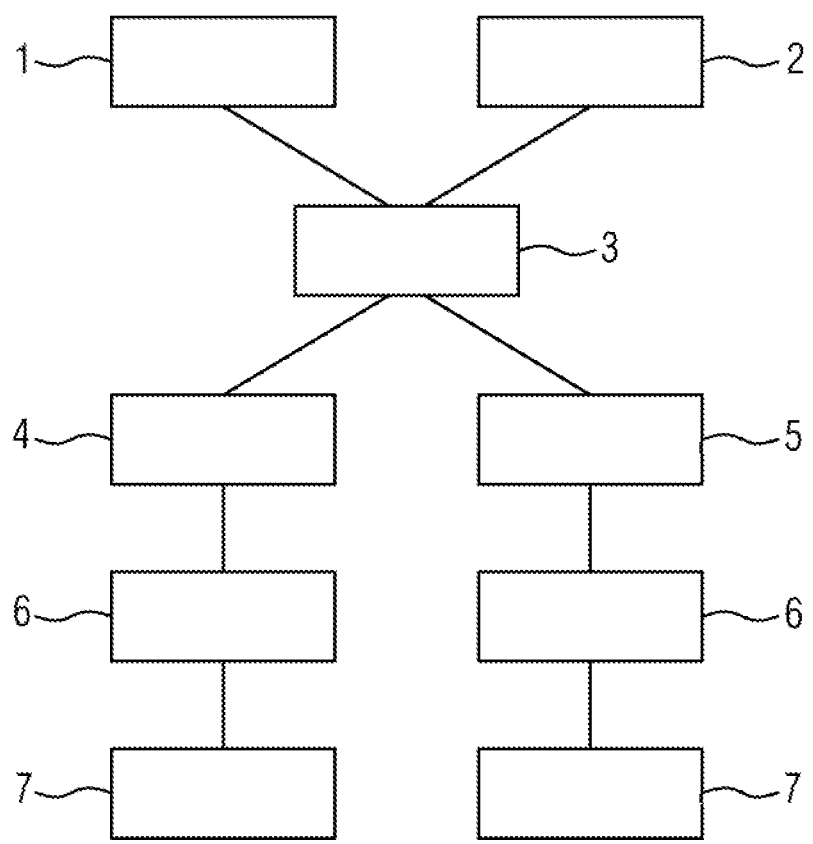

METHOD FOR PREHEATING A CATALYTIC CONVERTER

CROSS-REFERENCE TO RELATED APPLICATIONS

This application claims the benefit of PCT Application PCT/EP2020/074948, filed Sep. 7, 2020, which claims priority to German Application 10 2019 215 698.3, filed Oct. 11, 2019. The disclosures of the above applications are incorporated herein by reference.

TECHNICAL FIELD

The disclosure relates to a method for preheating a catalytic converter which is arranged in the exhaust-gas flow of a motor vehicle and which has an electrically heated catalyst.

BACKGROUND

It is known that catalytic converters arranged in the exhaust-gas flow of motor vehicles attain their full functionality only at a particular temperature. In order to attain this light-off temperature as early as possible, it is known to preheat the catalytic converter. This is for example performed electrically, where an electrically heated catalyst, for example, is used for this purpose. Such a heating catalytic converter may, for example, be of disk-shaped form and have a honeycomb structure. Exhaust gas flows through the heating catalytic converter. The exhaust gas is heated in the process and impinges on a further catalytic converter, which may, for example, be configured as a three-way catalytic converter.

The preheating of a catalytic converter with an electrically heated catalyst prior to the cold start of a vehicle engine is thus known. For example, the preheating operation is commenced upon the opening of a door of the vehicle, that is to say for example 5 to 10 seconds before the engine starting operation. However, if the engine starting operation does not take place or is terminated immediately after starting, for example, also in the event of a vehicle door being opened and closed multiple times, the preheating operation is initiated multiple times, or inefficient preheating takes place, which places a high load on the battery of the motor vehicle.

SUMMARY

The present discloser provides a method of the stated type which allows efficient preheating of a catalytic converter arranged in an exhaust-gas flow of a motor vehicle and having an electrically heated catalyst.

The method for preheating the catalytic converter includes the following steps: preheating the catalytic converter with an electrically heated catalyst to a maximum temperature within a period of time before the initial engine starting operation; in the process, monitoring the temperature of the electrically heated catalyst and the battery state of the vehicle; during the preheating, checking whether or not the battery state has fallen below a state threshold; if so, stopping the heating of the electrically heated catalyst and shifting a combustion center of gravity in a manner dependent on the present electrically heated catalyst temperature; if not, further heating the electrically heated catalyst until the maximum temperature is reached again.

Implementations of the disclosure may include one or more of the following optional features. In some implementations, the preheating of the catalytic converter by the electrically heated catalyst for the initial cold start of the vehicle engine (when the catalyst temperature is approximately equal to the ambient temperature) is performed to a maximum temperature within a period of time. The period of time may be 8 seconds before the engine starting operation, and the maximum temperature may be 600° C. At the same time, the electrically heated catalyst temperature and the battery state of the vehicle are thus monitored. The method includes checking whether or not the battery state has fallen below a state threshold.

If so, the heating of the electrically heated catalyst is stopped, and an engine-internal measure is performed, by way of a shift of the combustion center of gravity of the vehicle engine, in a manner dependent on the electrically heated catalyst temperature present before the engine starting operation, in order to achieve emissions equivalent to those in the former case with activation of the electrically heated catalyst. Here, the lower the electrically heated catalyst temperature before the engine starting operation, the greater the degree to which the combustion center of gravity is delayed.

If the battery state has not fallen below a state threshold, the electrically heated catalyst is, in a manner dependent on the present temperature and before the repeated activation, heated further or again until the maximum temperature, for example 600° C., is reached again.

In this way, it is possible to avoid a situation in which, if the door is opened multiple times, the electrically heated catalyst is repeatedly heated and the battery state falls below a state threshold (a safety level). After the engine starting operation and during the catalyst heating phase, the electrically heated catalyst can continue to be activated with high power until the catalytic converter arranged downstream thereof reaches its operating temperature.

In some examples, the method includes checking, upon the initial opening of a door of the vehicle, whether or not the battery state of the vehicle has fallen below a state threshold. In some examples, the preheating of the catalytic converter, using the electrically heated catalyst, is commenced already upon the opening of a door of the vehicle, for example 5 to 10 seconds before the engine starting operation. If, upon the opening of the door, the battery state of the vehicle lies below the state threshold, then the abovementioned engine-internal measures are initiated. Otherwise, if the battery state lies above the state threshold, the electrically heated catalyst is heated further.

Therefore, if the vehicle door is opened multiple times, the electrically heated catalyst is not repeatedly newly heated, but rather the heating is continued until the maximum temperature is reached, or reached again, if the battery state lies above the state threshold.

During the further heating of the electrically heated catalyst, at a present temperature thereof, an electrical power is required for the electrically heated catalyst until the maximum temperature is reached. This electrical power is calculated from the temperature difference between maximum temperature×electrically heated catalyst heat capacity divided by the preheating time.

For example, the electrical power is limited to a maximum permitted power.

In such a method for preheating a catalytic converter, secondary air may be injected upstream of the electrically heated catalyst to improve the transport of heat from the electrically heated catalyst to the catalytic converter. In some examples, the secondary air may be injected only upon the commencement of the engine starting operation, in order that the electrically heated catalyst temperature does not decrease too quickly within a short time if starting does not take place, in order to thus have the effect that the next heating operation of the catalytic converter continues to remain energy-efficient.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 1 shows a highly schematic flow diagram of the method according to the discloser.

Like reference symbols in the various drawings indicate like elements.

DETAILED DESCRIPTION

Referring to FIG. 1, a schematic flow diagram of method for efficient preheating of a catalytic converter arranged in an exhaust-gas flow of a motor vehicle and having an electrically heated catalyst. The method includes preheating of the catalytic converter by an electrically heated catalyst for an initial cold start takes place within a period of time of, for example, 8 seconds before an engine starting operation, to a maximum temperature of 600° C. (step 1). At the same time, the method includes monitoring the electrically heated catalyst temperature and the battery state of the vehicle, as indicated by step 2. Upon the next opening of the door of the vehicle, the method includes checking in step 3 whether the battery state of the vehicle lies below a state threshold. If so, then in step 4, the method includes stopping the heating of the electrically heated catalyst, and performing or intensifying an engine-internal measure in the form of a shift of a combustion center of gravity, in a manner dependent on the electrically heated catalyst temperature present before the engine starting operation.

If the battery state lies above the set state threshold, then in step 5, the method includes heating the electrically heated catalyst, in a manner dependent on the present temperature, again until the maximum temperature of 600° C. is reached again. For example, if a present temperature of the electrically heated catalyst is 300° C., the electrical power is calculated from the temperature difference between the maximum temperature of 600° C. and the present temperature of 300° C.×electrically heated catalyst heat capacity divided by the preheating time of 8 seconds. This power is limited to a maximum permitted power and is required until such time as the maximum temperature has been reached.

After the engine starting operation and during the heating phase of the catalytic converter, the electrically heated catalyst continues to be activated with high power until the catalytic converter arranged downstream thereof reaches its operating temperature (step 6). In step 7, the method includes injecting secondary air upstream of the electrically heated catalyst, specifically after the commencement of the engine starting operation.

A number of implementations have been described. Nevertheless, it will be understood that various modifications may be made without departing from the spirit and scope of the disclosure. Accordingly, other implementations are within the scope of the following claims.

What is claimed is:

1. A method for preheating a catalytic converter arranged in an exhaust-gas flow of a motor vehicle and having an electrically heated catalyst, the method comprising:
   preheating the catalytic converter with an electrically heated catalyst to a maximum temperature within a period of time before an initial engine starting operation;
   simultaneously as preheating the catalytic converter, monitoring the temperature of the electrically heated catalyst and a battery state of the motor vehicle;
   during the preheating, checking when the battery state falls below a state threshold;
   when the battery state falls below the state threshold:
      stopping the heating of the electrically heated catalyst and shifting a combustion center of gravity in a manner dependent on a present electrically heated catalyst temperature; and
   when the battery state does not fall below the state threshold: further heating the electrically heated catalyst until the maximum temperature is reached again.

2. The method of claim 1, wherein upon the initial opening of a door of the motor vehicle, the method includes checking when the battery state falls below a state threshold.

3. The method of claim 1, wherein during the further heating of the electrically heated catalyst, at a present temperature thereof, an electrical power is demanded for the electrically heated catalyst until the maximum temperature is reached.

4. The method of claim 3, further comprising calculating the electrical power from a temperature difference between maximum temperature×electrically heated catalyst heat capacity divided by a preheating time.

5. The method of claim 3, wherein the electrical power is limited to a maximum permitted power.

6. The method of claim 1, further comprising injecting secondary air upstream of the electrically heated catalyst.

7. The method of claim 6, wherein the secondary air is injected only upon a commencement of the engine starting operation.

* * * * *